May 8, 1962     R. G. ROHRBERG ET AL     3,032,870

BRAZED JOINT AND FABRICATION METHOD

Filed June 18, 1959     3 Sheets-Sheet 1

INVENTORS
RODERICK G. ROHRBERG
EDWARD S. BOYD
BY
ATTORNEY

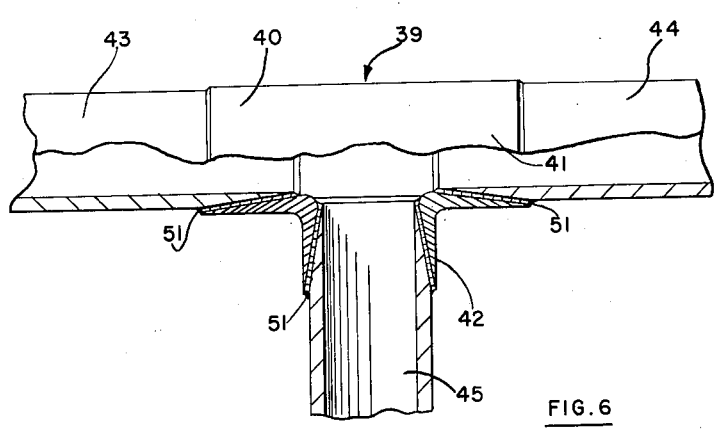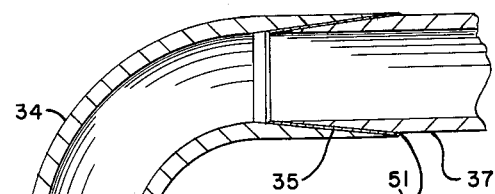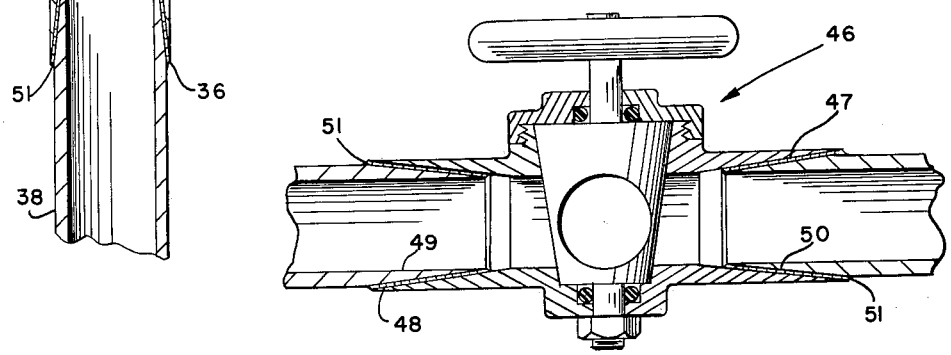

United States Patent Office 3,032,870
Patented May 8, 1962

---

3,032,870
BRAZED JOINT AND FABRICATION METHOD
Roderick G. Rohrberg, Inglewood, and Edward S. Boyd, Gardena, Calif., assignors to North American Aviation, Inc.
Filed June 18, 1959, Ser. No. 821,308
3 Claims. (Cl. 29—479)

This invention relates to the fabrication of joints between adjacent sections of pipe, tubing, conduits or other open-ended members, and is more specifically directed to residually brazed joints and to the method for securing together open-ended metal elements.

Although many techniques and fittings have been used in the fabrication of leak proof joints between sections of pipe or tubing, most such techniques normally require use of threaded unions, or the employment of welded seams, alone or in combination with various auxiliary, mechanically or weldingly attached back up sleeves. Irrespective of which conventional method is employed, the resulting joint is either excessively heavy and bulky, or it requires expensive and time consuming fabrication techniques.

Where brazing techniques have been adapted for tube or conduit securement, reliance has primarily been placed upon the employment of capillary flow of the brazing alloy into the area of the joint.

Capillary flow techniques generally require the use of a sleeve member in conjunction with the conduit sections to be joined, and furthermore require the positioning of a ring of brazing alloy within a recess between the tubing and whatever sleeve member is employed. In the alternative, the alloy is sometimes simply placed at the edge between the sleeve and the tubing.

To obtain a satisfactory joint when using capillary flow methods, it is not only essential that the tubing and sleeve conform to extremely close dimensional tolerances, but it is also most urgent that the spacing between the mating surfaces of these members be maintained within the extremely close tolerances required by whatever brazing alloy is utilized. Where a straight sleeve is employed, for example, means must be provided for obtaining the same spacing between the sleeve and conduit sections about the circumference of the conduit. If this is not done, capillary flow will not be obtained and the joint will be discontinuous; proper flow only occurring where the mating surfaces are the correct distance apart.

Furthermore, the employment of capillary flow brazing techniques results in severe heat transmission variations and a general reduction in the rate of heat transmission throughout the brazed areas of the joint. As a consequence of this inability to obtain an even heat balance and rapid heating to brazing temperatures, the joint area suffers a serious anneal and loss of strength where heat-treated tubing is used. Where non-heat treated tubing is employed, long heating cycles encourage undesirable alloy flow internally of the tubing, and increase the risk of contamination of the alloy and the parent stock. In addition, since optimum capillary flow occurs within specific close temperature ranges for each alloy, wide variations in temperature during brazing result in attainment of proper flow in local areas forming only a small proportion of the total joint area.

Because of the necessity for placement of the brazing alloy by capillary flow and because of the impracticability of maintaining perfect alignment between a sleeve and the tubing sections which it is desired to secure together, it is essential to provide a reservoir of sufficient size to insure flow of alloy wherever the spacing between the tubing and the sleeve exceeds that obtaining where a perfect fit is accomplished. Since the brazing alloy does originate from a reservoir, it will be apparent that the quantity of brazing alloy required for use will greatly exceed that necessary for forming the joint as such. It has been determined that where capillary flow techniques are employed, the quantity of alloy which must be utilized is a minimum of at least 50% greater than that which is actually used in forming the joint.

In addition, because of variations in the temperature of different zones in the joint being brazed, the flow of alloy is subject to preferential capillary flow and preferential wetting forces.

Another defect of conventional capillary flow techniques is the high probability that brazing alloy will flow into the space between the adjoining sections of tubing and waste itself within the tube by dripping into it.

It has also been noted that where recess grooves are used to form the reservoirs for brazing alloy in capillary flow techniques, a pressure unbalance develops as the result of capillary flow of alloy out of the recess at brazing temperatures. It has been observed that even though capillary forces may have provided for the formation of fillets of molten alloy, such fillets are, in many instances, drawn back into the recess as pressure is reduced within the recess as the result of gravity flow of alloy or differential pressures resulting during the cooling cycle.

It is an object of our invention to provide a method for securing adjoining tubes or conduits which will obviate the foregoing as well as other defects of known techniques. Our principal object is to furnish a simply fabricated, inexpensive tubing or conduit joint of maximum strength. We desire to provide a joint which is extremely light in weight and which neither unduly increases the external dimensions of the tubing system nor requires the presence of a restriction in the flow line.

It is another object of our invention to provide a fitting, as well as a method for fabricating a joint, which eliminate the necessity for employing an inert gas atmosphere in the vicinity of the braze in order to obtain continuity of braze and the formation of a firm bond with the parent metal. We also desire to provide a tube fitting and a method for fabricating a tubing joint which very substantially diminish the time required for making a connection between adjoining sections of conduit.

In addition, it is an important object of our invention to eliminate the necessity of maintaining precision alignment of the tubing or conduit sections to be joined during the brazing cycle.

We also desire to provide a brazed joint which can be fabricated with a minimum thickness of brazing alloy disposed between the surfaces to be joined and which, for this reason, substantially increases the strength and continuity of the resulting joint.

These as well as further objects will become apparent from a consideration of the following description as related to the drawings in which:

FIGURE 5 is a partly sectional view of a T fitting embodying our residual lap braze principles;

FIGURE 6 is a sectional view of a 90° straight elbow joint;

FIGURE 7 is a sectional view of a valve-conduit joint constructed in accordance with our invention;

Figure 1:
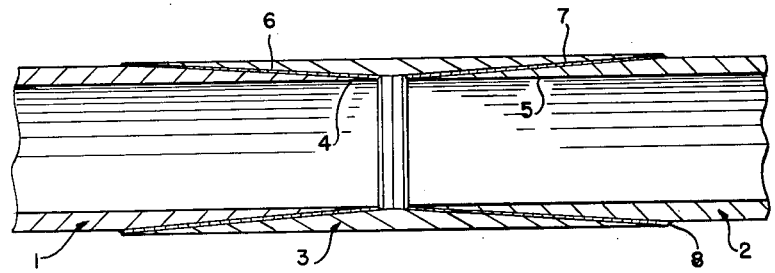
FIGURE 1 is a sectional view of the brazed joint of our invention.

Referring specifically to the drawings, and particularly to FIGURE 1 thereof, the tubular brazed joint of our invention generally comprises a pair of axially aligned open-ended members 1 and 2, securely joined together by the metal sleeve 3. These members as well as the sleeve are, of course, constructed of any brazable material and may be of the same or different materials. The members 1 and 2 have tapered end sections 4 and 5, while the inner surface of the sleeve is flared outwardly from the midsection thereof to provide frusto-conical end sections 6 and 7. Respective opposing pairs of end sections 4 and 6 and 5 and 7 of the conduits 1 and 2 and sleeve 3 are securely joined together by the brazing alloy 8 disposed between these surfaces during assembly and prior to heating to brazing temperature.

An important aspect of our invention resides in the provision of brazing alloy intermediately of the sleeve and the conduit end sections in intimate contact with the inner surfaces of the sleeve and the outer tapered surfaces of conduits 1 and 2. The configuration of our joint permits performance of a residual braze between the opposed parent metal surfaces and thus avoids the necessity of relying upon capillary flow to place the brazing alloy in the required areas.

Figure 3:
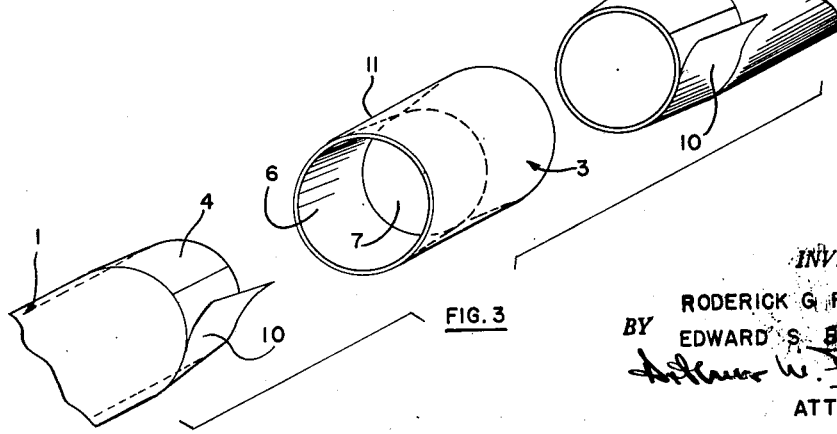
FIGURE 3 is an exploded perspective view, partly in phantom, of the joint of FIGURE 1 showing application of the brazing alloy in the form of foil strips.

Brazing alloy may be applied to the area to be brazed in several different manners. In the illustration of FIGURE 3, the brazing alloy, in the form of a thin filler metal or alloy strip 10 is wrapped around the tapered end sections 4 and 5 of the conduits 1 and 2 and then retained in position. Alternatively, the filler metal strip 10 could be applied to the end sections 6 and 7 of the sleeve.

We have, nevertheless, found it most desirable and productive of increased ease and economy of brazing to apply the brazing alloy to the internal surfaces of the sleeve by electroplating or chemically depositing it on those surfaces. If desired, a protective coating can be applied to the outer surface 11 of the sleeve 3 in order to prevent deposition of the brazing alloy thereon. This is not, however, essential since deposition of an extremely thin coating of filler metal on such surfaces will not interfere with or detract from the quality of the resulting joint. The application of brazing alloy integrally to the inner surfaces of the sleeve is especially desirable, since doing so greatly reduces the necessity for maintaining the surfaces of the sleeve clean and hence special handling techniques need not be utilized. It will, nevertheless, be understood that the parent metal surfaces of the sleeve and conduit will require cleaning by conventional methods at some time prior to brazing. In addition, application of brazing alloy to the internal surfaces of the sleeve is productive of increased economy since standard sleeves can be separately machined and brazed alloy applied to provide joint sleeves which can be separately stored and marketed as standard fittings.

Brazing alloy may be deposited on the surfaces of the sleeve by immersing the sleeve in an electroplating bath containing the desired metal ions and then by flowing current therethrough in accordance with conventional plating techniques. We have found it desirable in the deposition of alloy on the joint sleeve to deposit silver and copper in alternate thin layers. If a single metal is deposited on the sleeve, the brazing temperature will depend upon the liquidus of the metal. However, when two metals such as silver and copper are alternately deposited in thin layers of the order of magnitude of .0001" in thickness, the resulting coating will have the liquidus of the eutectic. For this reason, we prefer to deposit up to about seven thin alternate layers of silver and copper on the sleeve, where the first and last layers are silver. As a final external film, we apply a coating of gold in order to eliminate any tendencies of the silver to oxidize or corrode and to improve the characteristics of the alloy. It is not, in any event, essential to use an external coating of gold, since proper brazing can be accomplished without its employment. Other alloy combinations, such as one comprised of gold and nickel, can be applied in this manner.

Prior to the actual brazing operation, conduit end sections 1 and 2 are machined in any desired manner or chemically milled in accordance with known techniques to provide the tapered end sections 4 and 5. We have found that in order to provide a joint having maximum strength and one which is practical to produce, the angle of taper, indicated as angle "$a$" in FIGURE 8 should not be less than 1° nor more than 45°. Preferably this angle should be maintained at between 2° and 4½° for most advantageous results. The sleeve 3 has flare angles, indicated by angle "$b$" in FIGURE 9 which substantially correspond to the particular tapered angle utilized for the conduit sections.

Although we have found it desirable for certain applications to increase the total wall thickness of the tube and sleeve in the area of the joint, it is, nevertheless, no more than a design consideration as to whether the joint shall be constructed so as to be flush with the outer surfaces of the tube or whether it will exceed the outer diameter of the tubing. It should also be noted that it is perfectly feasible to construct a tubular brazed joint having a sleeve diameter which is less than the outer diameter of the adjoining section of tubing or conduits.

Figure 4:
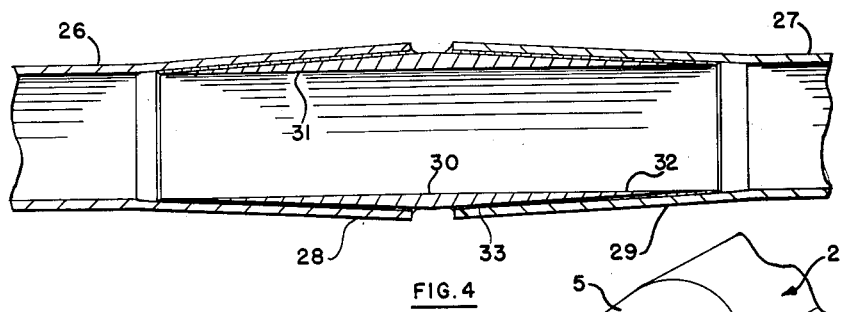
FIGURE 4 is a sectional view illustrating the application of our residual lap braze concepts to a joint used with extremely thin-walled conduit where it is impractical to machine a taper on the conduit end sections.

For example, we have found that it is highly advantageous to construct a venturi tube by utilizing an internal ring having an inside diameter which is less than the inside diameter of the adjoining sections of tubing by using the joint construction concepts disclosed herein. In such a case, the internal ring and tube configuration can be such as illustrated in FIGURE 4, except for the fact that the ring may be provided with an internal annular restriction of whatever diameter desired.

It will, of course, in such an instance, be necessary to provide proper conduits leading from the internal annular restriction and from the normal diameter conduit section of the tube in order to permit measurement of pressure differentials. Use of our joint concepts in the construction of the tube permits extremely close control of the diameters of the restricted annulus and the conduits, and thus permits construction of an extremely accurate venturi.

A joint is fabricated by inserting one of the conduit end sections, such as section 1, within the sleeve 3 until the sleeve is wedged firmly in position on the end of the conduit, after which the other conduit end 2 is similarly inserted within the sleeve 3 and wedged therein. Because the conduit end sections are tapered and the internal or external surfaces of the sleeve are flared to correspond substantially with the angle of taper of the conduit end sections, the simple urging of the conduits axially towards one another will cause their alignment without necessity for use of the complex fixtures normally needed to accomplish this result.

After the conduit end sections have been wedged within the sleeve 3, the assembled joint is subjected to sufficient heat to assure attainment of brazing temperatures at the surfaces of joinder. The conduits should be urged together in an axial direction during the heating and cooling cycles in order to insure maintenance of positive contact between the opposed surfaces of the parent metal. It is not, however, necessary to apply more than a slight axial load to obtain sufficient wedging. In addition, application of a wedging action prior to brazing will result in the application of sufficient wedging during heating and cooling to form the joint properly. This squeezing action is particularly advantageous because it reduces the quantity of brazing alloy separating the opposed parent metal surfaces and encourages the formation of an almost direct parent metal to parent metal bond. It also provides for the formation of fillets at the edges formed between the sleeve and the conduits by causing the extrusion of brazing alloy at these edges. Furthermore, any angular error between the surfaces is, for all practical purposes, eliminated as a result of the relatively high local pressures developed as a result of the camming action during the brazing cycle.

Figure 8:
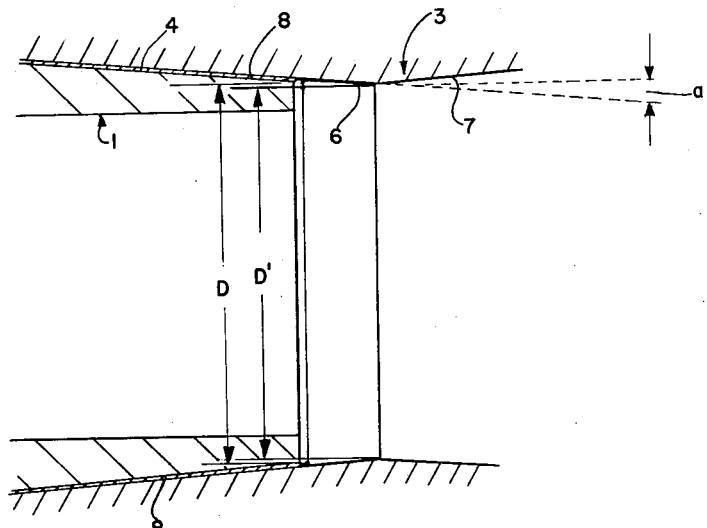
FIGURE 8 is an enlarged, fragmentary, sectional view of the tubular joint of FIGURE 1.
Figure 9:
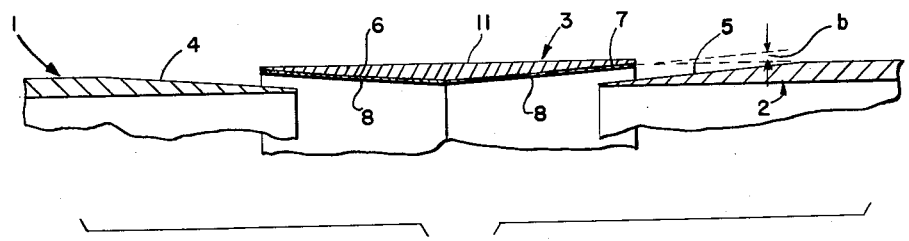
FIGURE 9 is an exploded, fragmentary, sectional view of the sleeve and conduit sections shown as joined in FIGURE 1.

In order to assure attainment of a wedging action between the opposed surfaces of the sleeve and the conduits, the size relationships of the sleeve and conduits should be such as to prevent the conduits from abutting one another within the sleeve. If they are permitted to do so, it will not be possible to apply axial loads to the tubes to urge them into wedging contact with the inner end surfaces of the sleeve and, therefore, distribution of brazing alloy will not be as even as when wedging is accomplished. This relationship can be obtained by forming the tubes and sleeve so that, as indicated in FIGURE 8, the smallest diameter of the outer surfaces of each of the tube segments is greater than the smallest diameter of the internal surface of the sleeve. In the alternative, the sleeve may be provided with a cylindrical surface, adjoining each of its frusto-conical surfaces, which is of sufficient length to prevent abutment. However, irrespective of the manner of avoiding interference with the wedging action desired, all that is important is that the opposed surfaces of the sleeve and conduits be capable of being wedged together.

The particular brazing temperature to which the joint assembly is heated will, of course, depend not only upon the materials of construction of the sleeve and conduits, but also upon the material selected as the brazing or filler metal. The filler metal which would normally be selected for utilization is one which is relatively non-aggressive, one which will effectively and quickly wet the parent metals upon reaching flow temperatures and one which will form satisfactory fillets at such temperature. In addition, the requisite filler metal should satisfy the requirements of strength, thermo-conductivity, and resistance to corrosion and oxidation which have been established for the particular joint. Furthermore, where the finished joint assembly is intended to be used at high temperatures, the brazing alloy must be capable of maintaining its shear and creep strengths at such temperatures.

A satisfactory filler metal fulfilling the foregoing requirements which has been conventionally used in the brazing of stainless steel is one which is composed of 92.3% silver, 7.5% copper, and .2% lithium. This brazing alloy has a liquidus at approximately 1625° F. and a solidus at approximately 1450° F., it developed satisfactory shear strengths at temperatures as high as 800° F. and will effectively braze two stainless steel elements at a temperature of 1600° F. This alloy, as well as others, such as a gold-nickel alloy, can be used in conjunction with any brazable metals. Selection of the particular alloy to be used will depend upon the environment of intended use and the nature of the parent metals to be joined.

Figure 10:
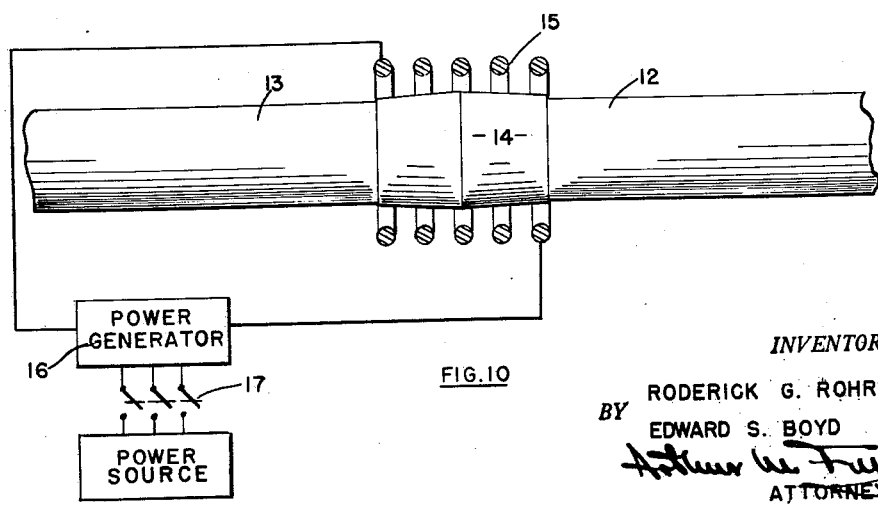
FIGURE 10 is a schematic view, partly in perspective and partly in section, showing one means for application of heat to the area of intended brazing.

One method of heating the joint assembly to brazing temperatures is schematically illustrated in FIGURE 10. Conduit end sections 12 and 13 have been inserted into the sleeve 14, which is, incidentally, shown as having tapered external end sections in order to decrease joint weight, and axially urged together. The assembly may then be heated as by the induction coil 15, circuited through a power generator 16 and switch 17 to a power source. Any other method of applying heat to the joint may be employed. One joint may, for example, be heated by application of an acetylene torch to the joint area, or the joint may be placed in a furnace, or a resistance wire wound heater used.

No necessity exists with the joint of our invention for utilization of an inert gas atmosphere during the brazing cycle. Because the parent metal surfaces which it is intended be joined are urged into intimate contact with one another, any atmosphere existing between such surfaces is, in effect, squeezed out, thus obviating the possibility of oxidation of such surfaces during the brazing cycle. An inert gas atmosphere may, however, be used where it is desired to insure the formation of fillets at the edges between the sleeve and conduits, and to reduce oxide or surface discoloration.

Figure 2:
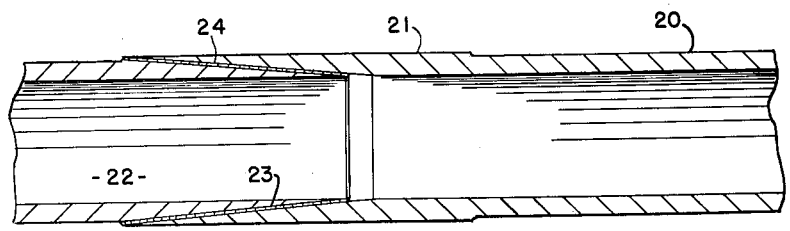
FIGURE 2 is a sectional view of a modified form of joint embodying the concepts of our invention.

In FIGURE 2 is illustrated a modification of our invention which eliminates the need for using a flared backing sleeve. In this form of joint, and as shown, the conduit 20 has undergone a preliminary forming step to increase the wall thickness of the end of the conduit by such amount as is dictated by design considerations. This may be accomplished by conventional tube upsetting methods as described on pages 38 through 41 of the Metals Handbook (1948, ASM). Where structural strength is important, we have found it desirable to increase the wall thickness to approximately 10% greater than its original thickness. It is, nevertheless, not essential to increase the wall size. The internal surface of the increased thickness end 21 of tube 20 is then flared outwardly at an angle of between 1° and 45° and preferably between 2° and 4½° in order to insure that internal stresses are transmitted to the joint in tension rather than in shear, while at the same time providing for a wedging self-centering action between the tubes to be joined. It will be noted in FIGURE 2 that conduit 22 is tapered at its end 23 to correspond substantially to the angle of flare of conduit 20. A brazing alloy 24 is provided between the surfaces to be joined either by deposition of the alloy to one of these surfaces prior to their abutment, by application of a filler metal strip to the end section 23 of the conduit 22 or by any other suitable means.

In this form of our invention, the smallest external diameter of conduit 22 should again be at least equal to the smallest diameter of the flared section of conduit 20. However, all that is required in this regard, is that the opposed surfaces to be joined, wedgingly engage each other.

FIGURE 4 illustrates a modification of our invention which is used when the walls of the conduits to be joined are so thin as to make it impractical or uneconomical to machine them. In such an instance, the conduits 26 and 27 are outwardly flared, instead of being machine tapered, to define frusto-conical end sections 28 and 29. Here too, the angle of flare of the inner surface of these sections should be between 1° and 45° and preferably between 2° and 4½°. The ring 30 is tapered at its ends to provide frusto-conical sections 31 and 32 which oppose the end sections 28 and 29 of the conduits. Brazing alloy 33 is disposed between the opposed surfaces of the conduits and the ring, either in the form of a thin strip or by deposition of a thin coating on the outer surfaces of the ring.

Where an internally disposed ring is employed in making the joint, as in this embodiment of our invention, the internal diameter of the ring should approximate that of the conduit in order to avoid obstructions in the flow line, and, furthermore, the ring should be of such size as to permit wedging of the tubes on the ring. Unless an axial end load is applied to the conduits to wedge them into engagement with the sleeve, any flow of brazing alloy between the opposed surfaces will only be such as results from capillary action which depends upon a critical spacing of the opposed surfaces.

In FIGURES 5, 6, and 7 are shown further modifications which embody the concepts of our invention. In FIGURE 5 is illustrated a 90° elbow fitting 34 which is provided at both ends with flared internal surfaces 35 and 36. Just as with the other embodiments of our invention, the ends of the conduits 37 and 38 which are intended to be joined together through the sleeve, in this case the elbow fitting 34, are tapered at their ends to correspond substantially with the angle of flare of the internal surfaces of the elbow. Since the internal diameter of the elbow fitting 34 is substantially the same as the internal diameters of the tubes and since the angles of flare and taper substantially correspond, the tubes 37 and 38 can be automatically self-centered with respect to the joints by simply wedging them into engagement with the surfaces 35 and 36 of the elbow 34.

In FIGURE 6 is shown the application of the concepts of our invention to a straight T fitting in which the T 39 is provided with outwardly flaring surfaces at each of its ends 40, 41 and 42. Conduits 43, 44 and 45 which come together at the T 39 are each tapered at their ends in order to wedge fit into the ends of the T.

FIGURE 7 is included to further exemplify the application of our joint concepts to other uses. In this figure is shown a gate valve 46, conventional in all respects except that no coupling provisions have been made for securement of the valve to a pipe system. Instead, the inlet and outlet ends of the valve have been provided with flared internal surfaces 47 and 48 for close engagement with the tapered end sections of conduits 49 and 50.

In all of the foregoing modifications of our invention, brazing alloy 51 is provided between the flared surfaces of the sleeve or sleeve-like sections and the tapered end sections of the conduits. It will also be clear that irrespective of which of the modifications of our invention is utilized, it is not essential that the wall thickness in the area of the joint be greater than the wall thickness of the original tube but that the thickness will depend upon the ultimate use intended for the tube for conduit. It should also be noted that our joint concepts may be utilized in the manufacture or construction of joints between any type of open-ended members, including, but not by way of limitation, tanks and containers of various types and sizes.

In order to exemplify the advantages resulting from the application of our concepts to tubular joints, the method described above for accomplishing securement of abutting sections of tubing was followed in the fabrication of the joints identified as Examples 1 through 4 in the following Table 1.

purposes of exemplification and is not to be taken by way of limitation, the spirit and scope of our invention being limited only by the terms of the accompanying claims:

We claim:

While our invention has been fully described and illustrated, it will be understood that this disclosure is for purposes of exemplification and is not to be taken by way of limitation, the spirit and scope of our invention being limited only by the terms of the accompanying claims:

We claim:

1. A method of effecting residual, non-capillary flow brazing of a joint connecting a thin-walled, high-strength tubing member to a high-strength fitting member without utilization of an inert atmosphere during the brazing cycle which comprises tapering the external surface on an end of said tubing member to a frusto-conical configuration having a flare angle of from about 2° to 4½°; flaring the internal cylindrical surface of an end of said fitting member to define a frusto-conical end section, said fitting end section having a flare angle substantially the same as that of the external end of said tubing member with the smallest internal diameter of the fitting end section being less than the smallest external diameter of the frusto-conical tubing end to form a positive predeterminately positioned tubing stop whereby said tubing member may be inserted a predetermined distance into said fitting end section in a self-centered, concentric, non-interference relationship; disposing a solid film of brazing alloy between the tubing member end section and the associated fitting end section so as to completely cover the tapered frusto-conical surfaces of said end sections; wedgingly inserting said tubing member end section into said fitting end section and heating said fitting and tubing member end sections to brazing temperature while applying an axial end load to said tubing member to urge said member into engagement with said fitting and extrude brazing alloy to form a fillet on said tubing member at the edge of said fitting whereby a high-temperature, high-pressure fluid tight joint may be achieved without requiring an inert gas atmosphere during the brazing operation to protect the brazing alloy from oxidation and corrosive contamination which would seriously impair the joint strength.

2. The method of claim 1 wherein the film of brazing alloy which is disposed between the tubing member end

*Table 1*

| | Example No. | | | |
|---|---|---|---|---|
| | 1 | 2 | 3 | 4 |
| Material of Tubing and Sleeve | 321 Cres Steel | 321 Cres Steel | 18-8 Cres Steel | 18-8 Cres Steel. |
| O.D. of Tube | .500 in | 1.500 in | .500 in | 1.00 in. |
| Wall Thickness of Tube | .049 in | .029 in | .006 in | .049 in. |
| Length of Sleeve | .750 in | 1.375 in | .500 in | 1.097 in. |
| O.D. of Sleeve | .540 in | 1.522 in | .568 in | 1.112 in. |
| Wall Thickness of Sleeve or Fitting | .020 to .055 in | .010 to .033 in | .568 to .512 in | .056 to .90 in. |
| Angle of Taper of Sleeve | 4°—12′ | 2°—25′ | 5°—30′ | 4°±¼°. |
| Length of Tapered Section | .375 in | .5312 in | .250 in | .486 in. |
| Weight of Sleeve | .008 lb | .019 lb | .005 lb | .075 lb. |
| Thickness of Alloy | .0007 in | .0007 in | .001 in | .001 in. |
| Composition of Alloy | 92.5 Ag + 7.3 Cu + .23 Li. | 92.5 Ag + 7.3 Cu + .23 Li. | 75 Au—25 Ni | 92.5 Ag + 7.3 Cu + .23 Li. |
| Manner of Alloy Deposition | foil sheet | Electrolytic Deposition. | Electrolytic Deposition. | foil sheet. |
| Brazing Temperature | 1,650° F | 1,650° F | 1,900° F | 1,700° F. |
| Bursting Pressure | 18,000 p.s.i | 2,500 p.s.i | 2,200 p.s.i | 18,000 p.s.i. |
| Location of Break | in tube | in tube | in tube | in tube. |

The joints of our invention are not only extremely light in weight but also conform very closely to the original dimension of the conduit. The weight of conventional fittings for the same size tubing will vary from approximately five to fifty times the weight of joints constructed in accordance with our method.

While our invention has been fully described and illustrated, it will be understood that this disclosure is for section and the fitting end section is a circumferentially wound foil strip of brazing alloy.

3. The method of claim 1 wherein said film of brazing alloy comprises a plurality of alternate layers of silver and copper wherein each such layer is individually deposited on said fitting to a thickness of about .0001″ with the first and last of said layers being silver.

(References on following page)

References Cited in the file of this patent

UNITED STATES PATENTS

| | | |
|---|---|---|
| 618,165 | Carlisle | Jan. 24, 1899 |
| 1,341,812 | Martin | June 1, 1920 |
| 1,872,022 | White | Aug. 16, 1932 |
| 2,003,488 | Hook | June 4, 1935 |
| 2,060,872 | Kraenter | Nov. 17, 1936 |
| 2,123,384 | Silliman | July 12, 1938 |
| 2,174,218 | Greene | Sept. 26, 1939 |

FOREIGN PATENTS

| | | |
|---|---|---|
| 788,902 | France | Oct. 19, 1935 |
| 651,037 | Great Britain | Mar. 7, 1951 |